(12) United States Patent
Breaux

(10) Patent No.: US 12,381,440 B2
(45) Date of Patent: Aug. 5, 2025

(54) DIRECTED AIR VENTILATION FOR LOWERING TEMPERATURE IN ENCLOSED GENERATORS

(71) Applicant: STEWART & STEVENSON LLC, Houston, TX (US)

(72) Inventor: Austin T. Breaux, Houston, TX (US)

(73) Assignee: STEWART & STEVENSON LLC, Houston, TX (US)

(*) Notice: Subject to any disclaimer, the term of this patent is extended or adjusted under 35 U.S.C. 154(b) by 0 days.

(21) Appl. No.: 18/956,515

(22) Filed: Nov. 22, 2024

(65) Prior Publication Data

US 2025/0183751 A1    Jun. 5, 2025

Related U.S. Application Data

(60) Provisional application No. 63/605,723, filed on Dec. 4, 2023.

(51) Int. Cl.
| | |
|---|---|
| *H02K 5/20* | (2006.01) |
| *F01D 15/10* | (2006.01) |
| *H02K 7/18* | (2006.01) |
| *H02K 9/18* | (2006.01) |

(52) U.S. Cl.
CPC ............ *H02K 5/207* (2021.01); *F01D 15/10* (2013.01); *H02K 7/1823* (2013.01); *H02K 9/18* (2013.01); *F05D 2220/76* (2013.01); *H02K 2205/09* (2013.01)

(58) Field of Classification Search
CPC ........ H02K 5/207; H02K 7/1823; H02K 9/18; H02K 2205/09; F01D 15/10; F05D 2220/76
See application file for complete search history.

(56) References Cited

U.S. PATENT DOCUMENTS

| | | | |
|---|---|---|---|
| 11,434,763 B2* | 9/2022 | Morris | F02C 6/00 |
| 12,163,435 B1* | 12/2024 | Morris | F02C 7/04 |
| 2020/0408147 A1* | 12/2020 | Zhang | F02C 6/00 |
| 2022/0258659 A1* | 8/2022 | Cui | B60G 11/27 |
| 2023/0349325 A1* | 11/2023 | Morris | F02C 7/20 |
| 2024/0410347 A1* | 12/2024 | Bodishbaugh | E21B 43/2607 |

* cited by examiner

*Primary Examiner* — Joseph Ortega
(74) *Attorney, Agent, or Firm* — EWING & JONES, PLLC

(57) ABSTRACT

An enclosed generator system includes a turbine, the turbine having turbine discharge piping and an alternator mechanically connected to the turbine. The enclosed generator system also includes an enclosure, the turbine and the alternator mounted to a base frame of the enclosure, the enclosure including a cooling air inlet and an enclosure space. Further, the enclosed generator system includes cooling air ducting connected to the enclosure space and the cooling air inlet and heated air ducting connected to the enclosure space and an exhaust enclosure. In addition, the enclosed generator system includes an exhaust stack, the exhaust stack connected to the turbine discharge piping and a turbine exhaust exit, the exhaust stack positioned within the exhaust enclosure.

16 Claims, 3 Drawing Sheets

DIRECTED AIR VENTILATION FOR LOWERING TEMPERATURE IN ENCLOSED GENERATORS

CROSS-REFERENCE TO RELATED APPLICATIONS

This application is a nonprovisional application which claims priority from U.S. provisional application No. 63/605,723, filed Dec. 4, 2023, which is incorporated by reference herein in its entirety.

TECHNICAL FIELD/FIELD OF THE DISCLOSURE

The present disclosure relates generally to turbines and generators, along with associated equipment.

BACKGROUND OF THE DISCLOSURE

Generators may be packaged in enclosures for protection from the environment. In some instances, the generator may use a turbine engine. Radiant heat from the turbine may heat the air within the enclosure, thereby potentially decreasing the efficiency of the turbine.

SUMMARY

An enclosed generator system is disclosed. The enclosed generator system includes a turbine, the turbine having turbine discharge piping and an alternator mechanically connected to the turbine. The enclosed generator system also includes an enclosure, the turbine and the alternator mounted to a base frame of the enclosure, the enclosure including a cooling air inlet and an enclosure space. Further, the enclosed generator system includes cooling air ducting connected to the enclosure space and the cooling air inlet and heated air ducting connected to the enclosure space and an exhaust enclosure. In addition, the enclosed generator system includes an exhaust stack, the exhaust stack connected to the turbine discharge piping and a turbine exhaust exit, the exhaust stack positioned within the exhaust enclosure.

A method of cooling an enclosure space is disclosed. The method includes supplying an enclosed generator system, the enclosed generator system including an enclosure, the enclosure including a cooling air inlet and the enclosure space. The enclosed generator system also includes a turbine, the turbine positioned within the enclosure and turbine discharge piping connected to the turbine. In addition, the enclosed generator system includes cooling air ducting connected to the enclosure space and the cooling air inlet and heated air ducting connected to the enclosure space and the exhaust enclosure. Further, the enclosed generator system includes a heated air outlet connected to the exhaust enclosure and an exhaust stack, the exhaust stack connected to the turbine discharge piping and a turbine exhaust exit, the exhaust stack positioned within the exhaust enclosure. The method also includes creating exhaust in the turbine and discharging the exhaust through the turbine discharge piping and discharging exhaust through the turbine exhaust exit. In addition, the method includes pulling cooling air through the cooling air inlet and into the cooling air ducting and discharging the cooling air into the enclosure space. Further, the method includes heating the cooling air in the enclosure space from radiant heat from the turbine and alternator to form heated air and transporting heated air through the exhaust enclosure and out the heated air outlet. Also, the method includes pulling exhaust through the exhaust enclosure and discharging the exhaust through the exhaust exit, wherein the heated air in the exhaust enclosure pulls air within the exhaust enclosure using the Bernoulli principle.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
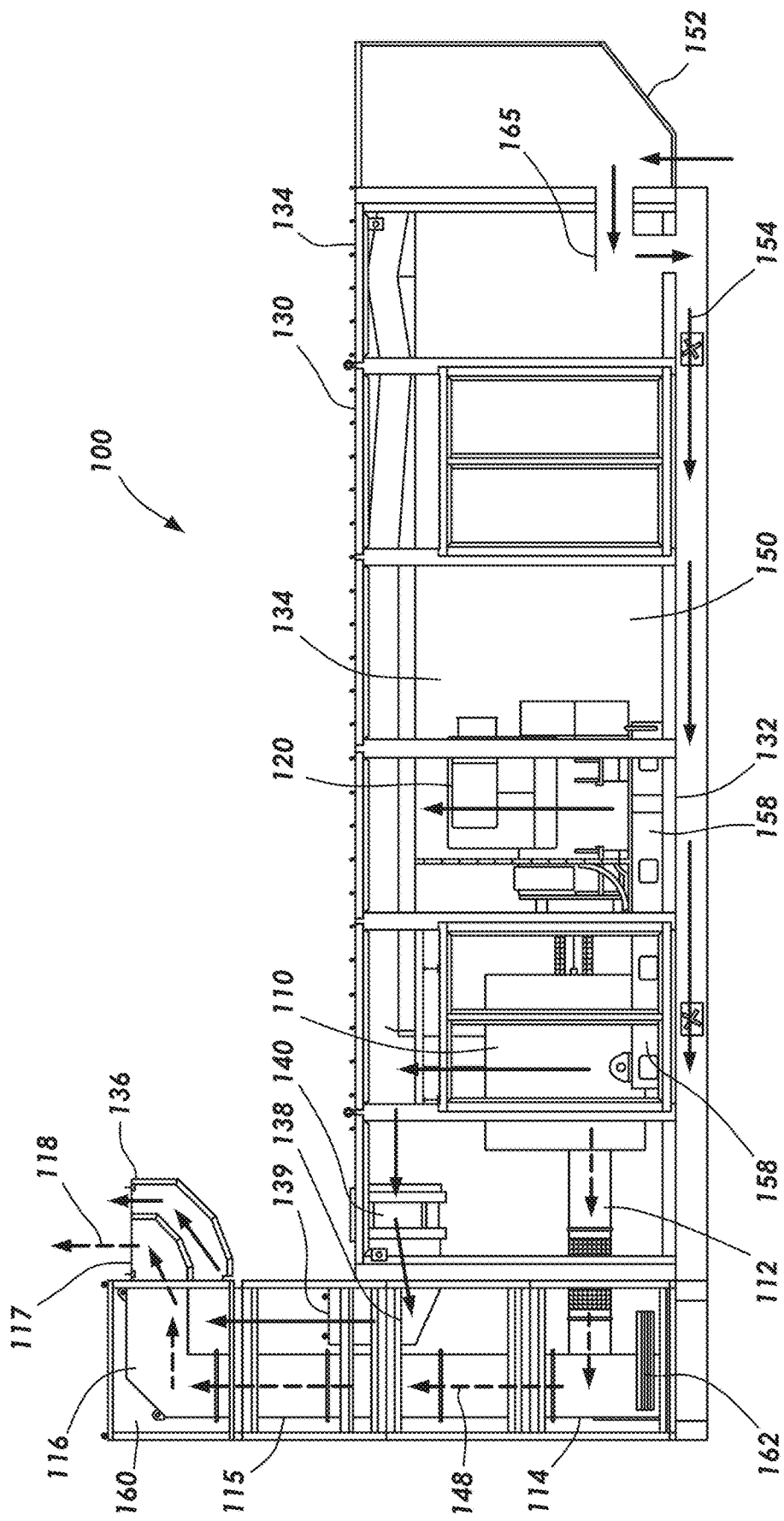
FIG. 1 depicts a cutaway side view of an enclosed generator system consistent with certain embodiments of the present disclosure.
Figure 2:
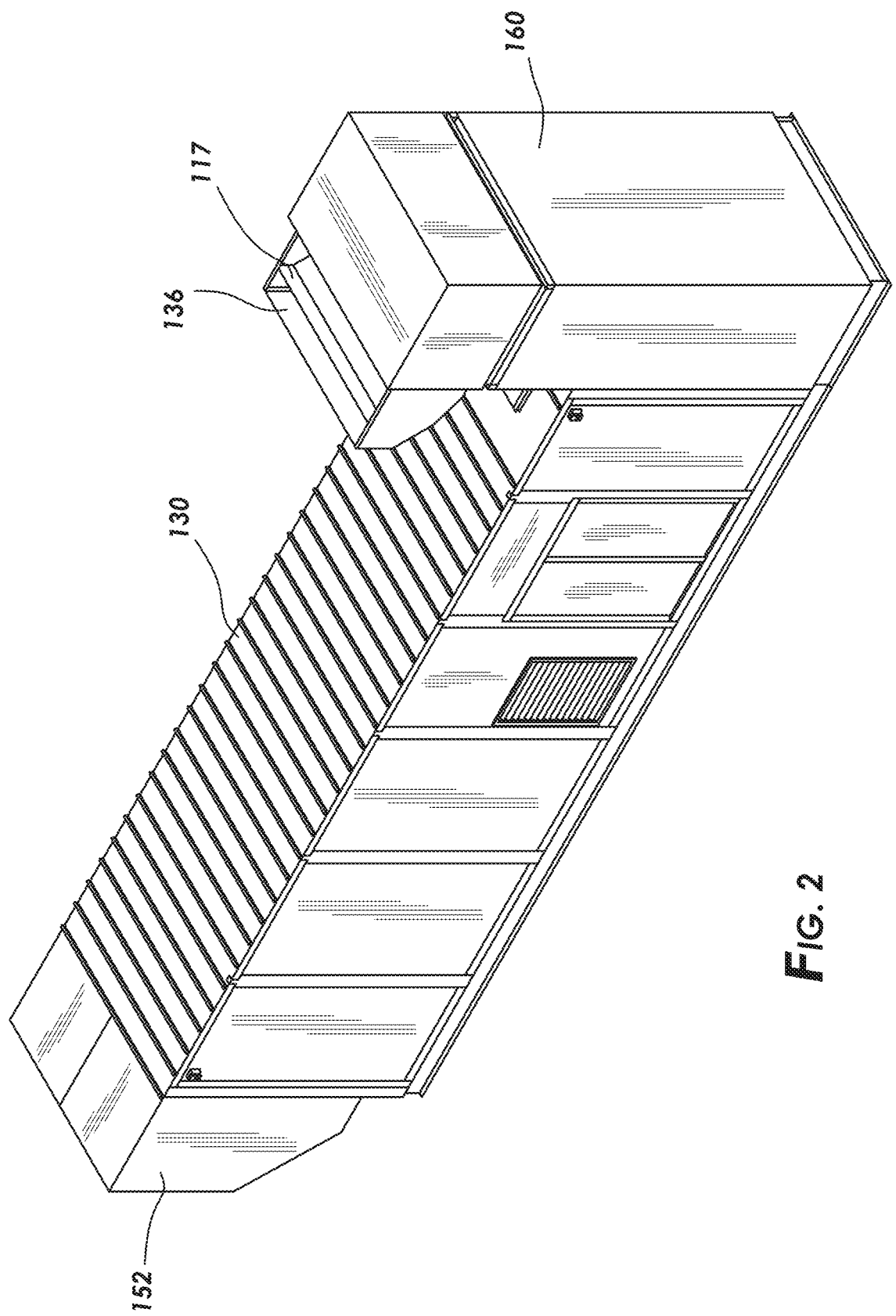
FIG. 2 depicts a perspective view of an enclosure of the enclosed generator system consistent with certain embodiments of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 is a cutaway side view of enclosed generator system 100 consistent with certain embodiments of the present disclosure. Enclosed generator system 100 includes enclosure 130, within which turbine 110 and alternator 120 are positioned. Turbine 110 may be mechanically connected to alternator 120 and both mechanically mounted to skid base 158, which is connected to base frame 132 of enclosure 130.

Turbine exhaust leaves turbine 110 through turbine discharge piping 112. Turbine exhaust may be, for example, between 500° F. and 1550° F. Turbine discharge piping 112 may route turbine exhaust through exhaust stack 114, having vertical exhaust stack section 115 and horizontal exhaust stack section 116. A portion of exhaust stack 114 is within exhaust enclosure 160. Turbine exhaust exit 117 is located at the termination of exhaust stack 114. Exhaust path 118 is further shown in FIG. 1.

Turbine 110, turbine exhaust, and radiant heat from exhaust stack 114 may heat air within enclosure 130, which may be undesirable as hot air within enclosure 130 may degrade mechanical components and decrease the efficiency of turbine 110. FIG. 1 further depicts enclosure air cooling system 150 to address this potential issue.

Figure 3:
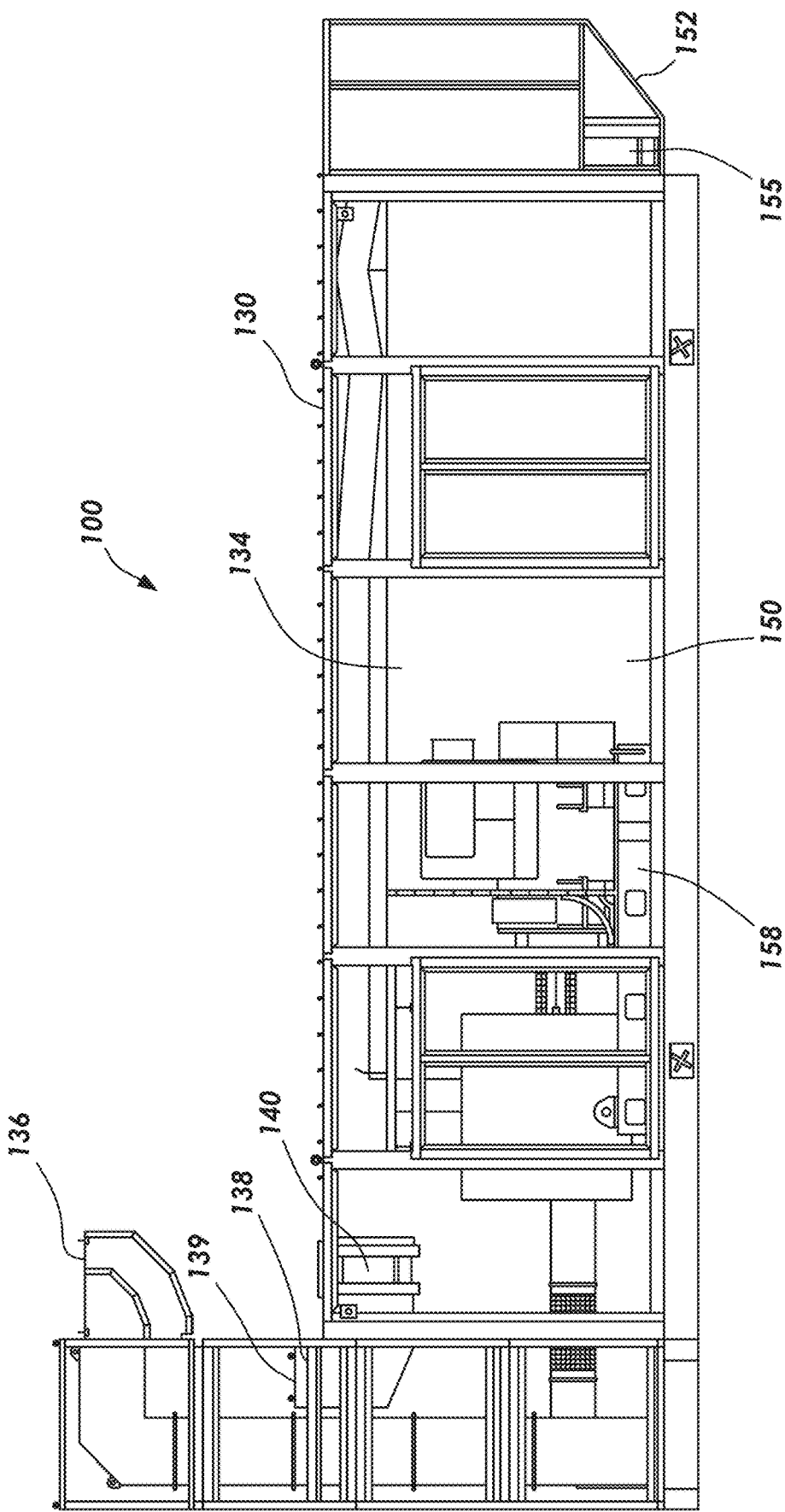
FIG. 3 depicts a cutaway view of an enclosed generator system consistent with certain embodiments of the present disclosure.

Air cooling system 150 cools the air inside enclosure 130. Cooling air is introduced through cooling air inlet 152 and through cooling air vent 165 into enclosure 130. Cooling air path 154 is shown in FIG. 1. As shown in FIG. 3, in certain embodiments, cooling air may be introduced using intake ventilation fans 155.

After cooling air has absorbed heat from turbine 110 and alternator 120, resulting in heated air, the heated air is drawn from enclosure space 134 using one or more exhaust fans 140 through heated air ducting 138 and into exhaust enclosure 160. The connection between heated air ducting 138 and exhaust enclosure 160 is exhaust opening 139. Heated air exits exhaust enclosure 160 through heated air outlet 136. Heated air path 148 is shown in FIG. 1. As is evident to one of ordinary skill in the art with the benefit of this disclosure, as the heated air exits enclosure space 134, exhaust fans 140 pull heated air from into exhaust enclosure 160. In certain embodiments, such movement would occur at air velocities ranging from 900 meters/second to 3800 meters/second and at pressures + or −2 psi from atmospheric pressure within enclosure space 134. Air within exhaust enclosure 160 and exhaust stack 114 may have a higher temperature than heated air existing enclosure space 134. Drawing of heated air past exhaust stack 114 within exhaust enclosure 160 may reduce the temperature of exhaust enclosure 160.

In certain embodiments, exhaust enclosure 160 may include vacuum breaker vent 162 to allow air entry into exhaust enclosure 160 to prevent or retard the formation of a vacuum without exhaust enclosure 160.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

The invention claimed is:

1. An enclosed generator system comprising:
   a turbine, the turbine having turbine discharge piping;
   an alternator mechanically connected to the turbine;
   an enclosure, the turbine and the alternator positioned within the enclosure, the enclosure including a cooling air inlet and an enclosure space;
   cooling air ducting connected to the enclosure space and the cooling air inlet;
   heated air ducting connected to the enclosure space and an exhaust enclosure, the exhaust enclosure having a heated air outlet;
   and
   an exhaust stack, the exhaust stack connected to the turbine discharge piping and a turbine exhaust exit, the exhaust stack positioned within the exhaust enclosure;
   wherein a connection between the cooling air ducting and the enclosure space is one or more cooling air vents; and
   wherein the one or more cooling air vents are positioned below the alternator and turbine.

2. The system of claim 1, wherein the turbine exhaust stack has a vertical exhaust stack section and a horizontal exhaust stack section.

3. The system of claim 1 further comprising one or more duct fans within the cooling air ducting.

4. The system of claim 1 further comprising an exhaust fan, the exhaust fan positioned between the enclosure space and the exhaust enclosure.

5. The system of claim 4, wherein the exhaust fan is connected to heated air ducting that extends into the exhaust enclosure.

6. The system of claim 5, wherein the exhaust stack terminates in an exhaust opening.

7. The system of claim 1, wherein the exhaust enclosure further includes a vacuum breaker vent.

8. The system of claim 1 further comprising an inlet fan, the inlet fan positioned within the cooling air inlet.

9. The system of claim 1, wherein the enclosure further includes a base frame.

10. The system of claim 9 further comprising a skid base, the skid base mechanically connected to the base frame, the alternator and turbine mechanically connected to the skid base.

11. The method of claim 9, wherein the enclosed generator system further comprises one or more duct fans within the cooling air ducting, the method further comprising pulling cooling air using the one or more duct fans.

12. The method of claim 9, wherein the cooling air is discharged within the enclosure space through the one or more cooling vents.

13. The method of claim 9, wherein the heated air is pulled from the enclosure space using one or more exhaust fans.

14. The method of claim 9 further comprising drawing heated air past the exhaust stack and reducing the temperature of the exhaust enclosure.

15. The method of claim 9 further comprising introducing air into the exhaust enclosure through a vacuum breaker vent.

16. A method of cooling an enclosure space comprising:
   supplying an enclosed generator system, the enclosed generator system including:
      an enclosure, the enclosure including a cooling air inlet and the enclosure space;
      a turbine, the turbine positioned within the enclosure;
      turbine discharge piping connected to the turbine;
      cooling air ducting connected to the enclosure space and the cooling air inlet;
      heated air ducting connected to the enclosure space and the exhaust enclosure;
      a heated air outlet connected to the exhaust enclosure;
      an exhaust stack, the exhaust stack connected to the turbine discharge piping and a turbine exhaust exit, the exhaust stack positioned within the exhaust enclosure;
      wherein a connection between the cooling air ducting and the enclosure space is one of more cooling air vents; and
      wherein the one or more cooling air vents are positioned below the alternator and turbine
   creating exhaust in the turbine and discharging the exhaust through the turbine discharge piping;
   discharging exhaust through the turbine exhaust exit;
   pulling cooling air through the cooling air inlet and into the cooling air ducting;
   discharging the cooling air into the enclosure space;
   heating the cooling air in the enclosure space from radiant heat from the turbine and alternator to form heated air;
   transporting heated air through the exhaust enclosure and out the heated air outlet;
   pulling exhaust through the exhaust enclosure; and
   discharging the exhaust through the exhaust exit.

* * * * *

UNITED STATES PATENT AND TRADEMARK OFFICE
CERTIFICATE OF CORRECTION

PATENT NO. : 12,381,440 B2
APPLICATION NO. : 18/956515
DATED : August 5, 2025
INVENTOR(S) : Breaux It is certified that error appears in the above-identified patent and that said Letters Patent is hereby corrected as shown below:

In the Claims

Claim 16, Column 4, Lines 48-50:
"wherein a connection between the cooling air ducting and the enclosure space is one of more cooling air vents; and"

Should read:
"wherein a connection between the cooling air ducting and the enclosure space is one or more cooling air vents; and"

Signed and Sealed this
Thirtieth Day of September, 2025

John A. Squires
*Director of the United States Patent and Trademark Office*